United States Patent
Grindstaff et al.

(10) Patent No.: US 7,106,339 B1
(45) Date of Patent: Sep. 12, 2006

(54) SYSTEM WITH LOCAL UNIFIED MEMORY ARCHITECTURE AND METHOD

(75) Inventors: Marcus Grindstaff, Folsom, CA (US); Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 10/410,080

(22) Filed: Apr. 9, 2003

(51) Int. Cl.
*G06F 12/02* (2006.01)
*G06F 15/167* (2006.01)

(52) U.S. Cl. .................. 345/543; 345/541; 345/542

(58) Field of Classification Search ........ 345/541–544, 345/519–520, 530, 501; 711/147–148, 153, 711/130, 152
See application file for complete search history.

(56) References Cited

U.S. PATENT DOCUMENTS

| | | | | |
|---|---|---|---|---|
| 4,811,205 A | * | 3/1989 | Normington et al. ....... 345/502 |
| 5,450,542 A | * | 9/1995 | Lehman et al. ............. 345/542 |
| 5,502,808 A | * | 3/1996 | Goddard et al. ............ 345/537 |
| 5,522,027 A | * | 5/1996 | Matsumoto et al. ........ 345/503 |
| 5,731,809 A | * | 3/1998 | Lin et al. .................... 345/542 |
| 6,020,903 A | * | 2/2000 | Jun ............................ 345/541 |
| 6,317,135 B1 | * | 11/2001 | Reddy ........................ 345/519 |
| 6,563,464 B1 | * | 5/2003 | Ballantine et al. ... 343/700 MS |
| 6,931,259 B1 | * | 8/2005 | Simmons et al. ......... 455/550.1 |
| 2003/0051083 A1 | * | 3/2003 | Striemer ...................... 710/72 |
| 2003/0098867 A1 | * | 5/2003 | Pai et al. .................... 345/543 |
| 2004/0160449 A1 | * | 8/2004 | Gossalia et al. ............ 345/543 |

* cited by examiner

*Primary Examiner*—Ulka Chauhan
*Assistant Examiner*—Joni Hsu
(74) *Attorney, Agent, or Firm*—The Law Offices of John C. Scott, LLC (57) ABSTRACT

Local memory associated with one or more companion devices within a system is mapped into a system memory for use by an application processor.

25 Claims, 4 Drawing Sheets

LUMA ARCHITECTURE

SYSTEM WITH LOCAL UNIFIED MEMORY ARCHITECTURE AND METHOD

TECHNICAL FIELD

The present invention pertains to memory mapping, and in some embodiments, to memory mapping in embedded communication system architectures, and in other embodiments, the present invention pertains to memory sharing in graphics chips and wireless communication devices.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific example embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In embodiments, the present invention provides a system and method in which distributed local memory is mapped into a system memory map providing a local unified memory architecture (LUMA). The system and method may reduce memory requirements of systems, such as systems having an embedded computer architecture as well as others. Furthermore, the system and method of embodiments of the present invention may reduce component count of such systems reducing cost and increasing reliability.

Figure 1:
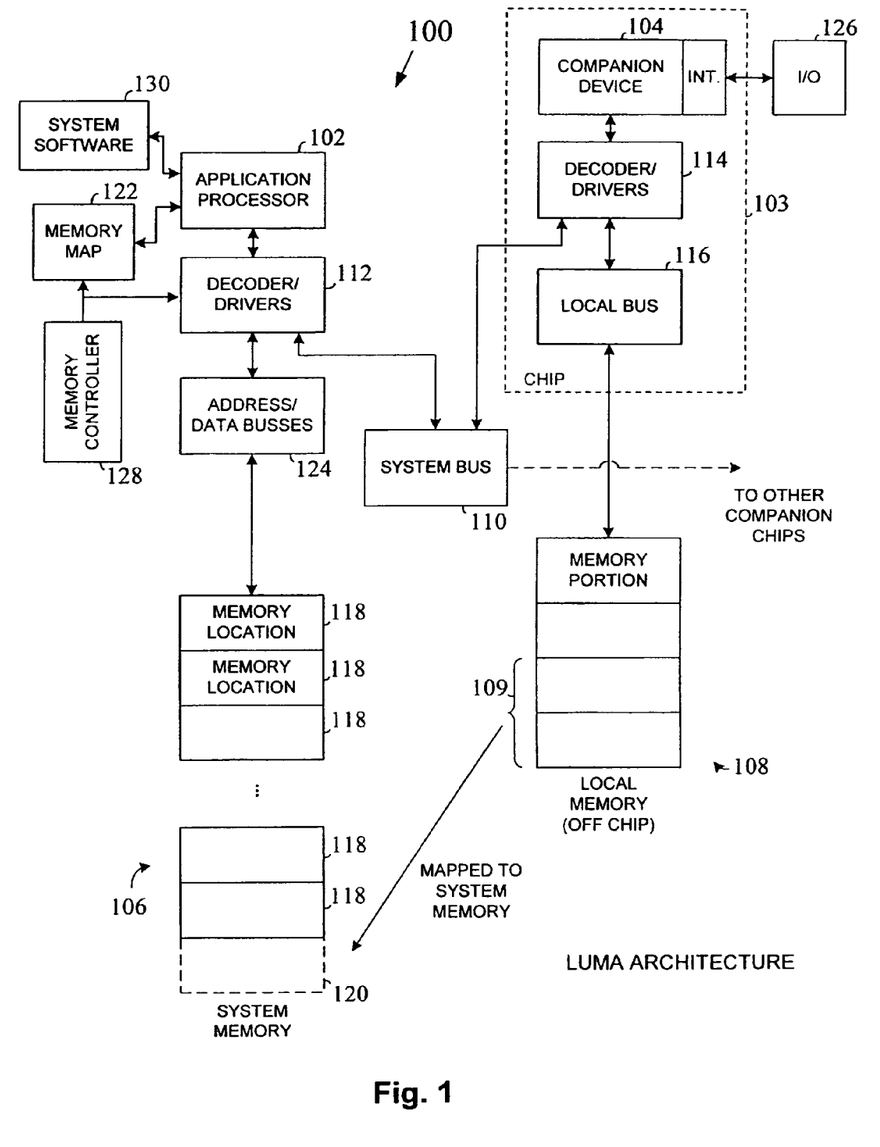
FIG. 1 is a block diagram of an example system with a local unified memory architecture in accordance with embodiments of the present invention.

FIG. 1 is a block diagram of an example system with a local unified memory architecture in accordance with embodiments of the present invention. System 100 may be part of a processing system such as a personal computer or may be part of an embedded system, such as wireless or mobile communication device. Examples may include a mobile data terminal, a wireless or cellular telecommunication device, including 2.5G and 3G communication devices, or a portable or stationary computer with wireless communication capability. The 2.5G and 3G communication devices may relate to the 2.5G and 3G specifications released in 1999 by the 3rd Generation Partnership Project (3GPP) and subsequently amended. System 100 may also be part a personal digital assistant (PDA) or a Web tablet. In some of these embodiments, system 100 may access data networks such as an intranet, the Internet or another data network.

In embodiments, an application processor or other functionality within the system may identify an available portion of local memory of one or more companion devices and map the available portion into system memory. In at least one approach, a memory mapper is provided (either as part of or separate from the application processor 102) to perform the mapping. The memory mapper may also serve to identify the available local memory portion. In some embodiments, the companion device(s) may include, for example, a graphics chip that interfaces with a graphics display, a wireless communication chip or device that interfaces with an antenna, and/or other device types. When an application running on the application processor issues an access request to access data in a system memory location, a decoder may determine if the system memory location is mapped from one of the local memories.

For mapped system memory locations, instead of using a memory cycle to address the system memory, in some embodiments, a bus cycle may be initiated to address the companion device to access data in the local memory associated with the companion device. The companion device may issue a memory cycle over its local bus to access the data in its associated local memory. The accessed data may be transferred between the application processor and companion device over the system bus.

In referring to FIG. 1, system 100 may include an application processor 102 that may run one or more system applications using system memory 106. Examples of these system applications may include applications that allow system 100 to function and serve its primary and/or intended purposes. System 100 also includes one or more companion devices 104 and associated local memory 108. Companion devices 104 may be chips or chipsets for performing specific tasks or interfacing with specific input/output (I/O) elements 126. For example, in one embodiment, one of companion devices 104 may be a graphics chip or chipset that interfaces with a graphics display such as a liquid crystal display (LCD).

In another embodiment, one of companion devices 104 may be a wireless device, chip or chipset that interfaces with an antenna for transmitting and/or receiving data over a wireless link. In these embodiments, one or more companion devices 104 may perform processing and processing tasks, such as display refresh, that does not require application processor 102. In some embodiments, companion devices 104 may be used by application processor 102 to offload some processing tasks. In embodiments, companion device 104 may be a single component such as a die integrated into a system, or can be an entire system of components. In other embodiments, companion device may be one or more die in one or more packages (e.g., chips) or may even be several chips that comprise a system such as a PC card.

When companion device provides wireless communications, I/O 126 may comprise one or more antennas to receive and/or transmit wireless communications. In these embodiments, the antenna may be a dipole antenna, a monopole antenna, a loop antenna, a microstrip antenna or other type of antenna suitable for reception and/or transmission of RF signals.

System 100 may also include a shared or common interconnect such as system bus 110 for system level communications between application processor 102, and one or more companion devices 104 and other components/devices not illustrated. Application processor 102 may access system memory 106 through address and data busses 124 in a conventional manner using memory cycles with the assistance of memory controller 128. Decoders and drivers 112 may decode memory addresses using memory map 122 and access system memory 106, as well as drive address and data busses 124 and system bus 110. Communications between application processor 102 and one or more companion devices 104 may take place over system bus 110 and may utilize system bus cycles. Although system 100 is illustrated as having system bus 110, embodiments of the present invention apply to the use of any communication link or interconnect structure for communications between the various elements.

Companion device 104 may have associated decoders and drivers 114 for interfacing with system bus 1110 and local bus 116. Local bus 116 allows communications between local memory 108 and companion device 104. In embodiments, companion device 104, decoders and drivers 114 and local bus, as well as other elements not illustrated, may be located on chip 103. In some embodiments, local memory 108 may be an off-chip memory or memory structure (e.g., separate from chip 103), while in other embodiments, local memory 108 may be an on-chip memory located on chip 103. In yet another embodiment, a portion of local memory 103 may be located on-chip and a portion may be located off-chip. In these embodiments, companion device 104 may manage memory issues associated with local memory 108 independent of where portions of local memory 108 may be located. At least a portion of local memory 108 supports operations being performed by companion device 104. In accordance with embodiments of the present invention, portions of local memory 108 that are not needed or currently being used by companion device 104 may be available for use by application processor 102.

In accordance with embodiments of the present invention, application processor 102 may identify an available portion (or portions) 109 of local memory 108 and map the available portion(s) to system memory 106. The mapping information may be stored in memory map 122. Applications running on processor 102 may address memory location 120 as though it were part of memory 106 providing the applications with additional memory. Application processor's system software 130, which may include system initiation software, may identify available portions of local memory associated with a companion device.

As part of running a system application, application processor 102 may issue an access request to access data in memory. The access request may be a conventional read or write request. Whether the data is located in system memory 106 or in a portion mapped from local memory 108 may not be known to the application or application processor 102. The access request may identify a memory location in system memory 106 which may identify one of memory locations 118, or mapped memory location 120. When an access request issued by the application identifies one of memory locations 118, a read or write cycle may be issued over address/data busses 124 to access the data directly in system memory 106. When the access request identifies mapped memory location 120 of system memory 106, decoders/drivers element 112 utilizes memory map 122 to determine the memory location within local memory 108. Since the physical location of mapped memory location 120 is in local memory 108 (e.g., memory associated with the companion device), in embodiments, application processor 102 may issue a system bus cycle on system bus 110 to address the particular companion device and access the data from the location in local memory 108. As part of the system bus cycle, the application processor is granted access to system bus 110 by a bus controller (not illustrated), and issues an access command with the data address. The data address may be decoded by decoders 114. In response companion device 104 may issue a read or write cycle on local bus 116 to access the data in the identified memory location (e.g., the data address) of local memory 108. In the case of a read request, companion device 104 responds over system bus 110 with the requested data. Application processor 102 may acknowledge receipt of the data over system bus 110.

In one embodiment, access requests, which may be system driver calls, received over system bus 110 from application processor 102 may be given a higher priority and may interrupt companion device during performance of read/write operations with local memory 108. This may reduce the latency of mapped memory locations 120. System device drivers of element 114 may accommodate any difference in latencies, as they would do between SDRAM and Flash memory elements within the system memory 106.

Examples of applications which may run on application processor 102 may depend on the primary purpose of system 100. For example, when system 100 is part of a personal computer, applications may include any software program running thereon. When system 100 is part of a wireless communication device (e.g., PDA, wireless telephone, web tablet), applications may include software and programs that relate to wireless communication. When system 100 is part of a microcontroller or is the companion device the microcontroller, applications may include controller type applications.

In some embodiments, companion device 104 may be used to perform tasks that could normally be performed by the application processor. These repetitive tasks may require system memory access. Examples of such tasks include display refresh (e.g., for a graphics chip), and other graphics intensive operations. This offloading may reduce power consumption because the application processor may be turned off or not used. For example, the application processor may not be needed for display refresh operations. This offloading may also free up processing cycles of the application processor and free up system bandwidth allowing for faster and more efficient processing by the application processor. In the case of a wireless device or chip, the companion device may maintain wireless network connectivity while the application processor sleeps, and may wake-up the application processor, for example, when information is received over the network. Portions of local memory 108 may be used by companion device 104 for these offloaded operations, although the companion device may also utilize portions of system memory 106 when additional memory is required. In these embodiments, the portion of local memory 108 used to perform these offloaded functions may be known allowing the mapping of the unused portion into mapped portion 120 of the system memory as discussed above.

Part of the reason there may be available portions of local memory 108 for mapping into system memory 106 is that predetermined amounts of memory may be provided for local memory 108. For example, for cost and manufacturing reasons, a typical memory unit used for local memory 108 may be a 1×16 SDRAM, even though companion device may utilize only a portion of this amount. Providing smaller memory units may be more expensive, and the unused portion may have no use by the companion device. The mapping of the unused portion may allow the system memory to be smaller thereby providing an overall cost savings, which may be important especially for embedded devices.

When companion device 104 is part of a wireless chip, or in some embodiments a wireless interface card, device 104 may include a transceiver element to receive and transmit RF signals in accordance with many various communication techniques. Examples of some suitable communication techniques may include digital and/or analog wireless communication techniques including code division multiple access (CDMA) techniques, wide band CDMA (WCDMA) techniques, or frequency division multiple access (FDMA) techniques, and/or time-division multiple access (TDMA) techniques. In some embodiments, device 104 may receive and/or transmit RF signals in accordance with one or more communication standards for wireless local area network (WLAN) communications, including, for example the IEEE 802.11(a), 802.11(b) and/or 802.11(g) (ANSI/IEEE 802.11, 1999, and as subsequently amended) standards for wireless local area networks, Bluetooth, the Digital Video Broadcasting Terrestrial (DVB-T) broadcasting standard, and/or the High performance radio Local Area Network (HiperLAN) standard. In one embodiment, device 104 may receive and transmit ultra wide band (UWB) wireless communications which uses simultaneous multi-tone transmissions.

Although embodiments of system 100 are described as having system bus 110 and local bus 116, in other embodiments, the busses may be replaced with any communication link including synchronous and asynchronous communication links. Although system 100 is illustrated as having several separate functional elements, one or more of the functional elements may be combined and may be implemented by combinations of software configured elements, such as processing elements including digital signal processors (DSPs), and/or other hardware elements. For example, processing elements of application processor 102 and companion device 104 may comprise one or more microprocessors, DSPs, application specific integrated circuits (ASICs), and combinations of various hardware and logic circuitry for at least performing the functions described herein.

In embodiments, companion device 104, associated decoders and drivers 114, local bus 116 and associated local memory 108 may be part of a separate semiconductor device/chip or card from other system elements. In embodiments, dynamic random access memory (DRAM), SDRAM or Flash, as well as other types of memory, and combinations thereof may be suitable for use for system memory 106 and local memory 108. In some embodiments, memories 106 and 108, or at least portions thereof, may include almost any storage medium, such as, but not limited to, any type of disk including floppy disks, optical disks, CD-ROMS, magnetic-optical disks, read-only memories (ROMs), random access memories (RAMs), electrically programmable read-only memories (EPROMs), electrically erasable and programmable read-only memories (EEPROMs), magnetic or optical cards, or any other type media suitable for storing information and being coupled to a communication interconnect such as a bus.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 4:
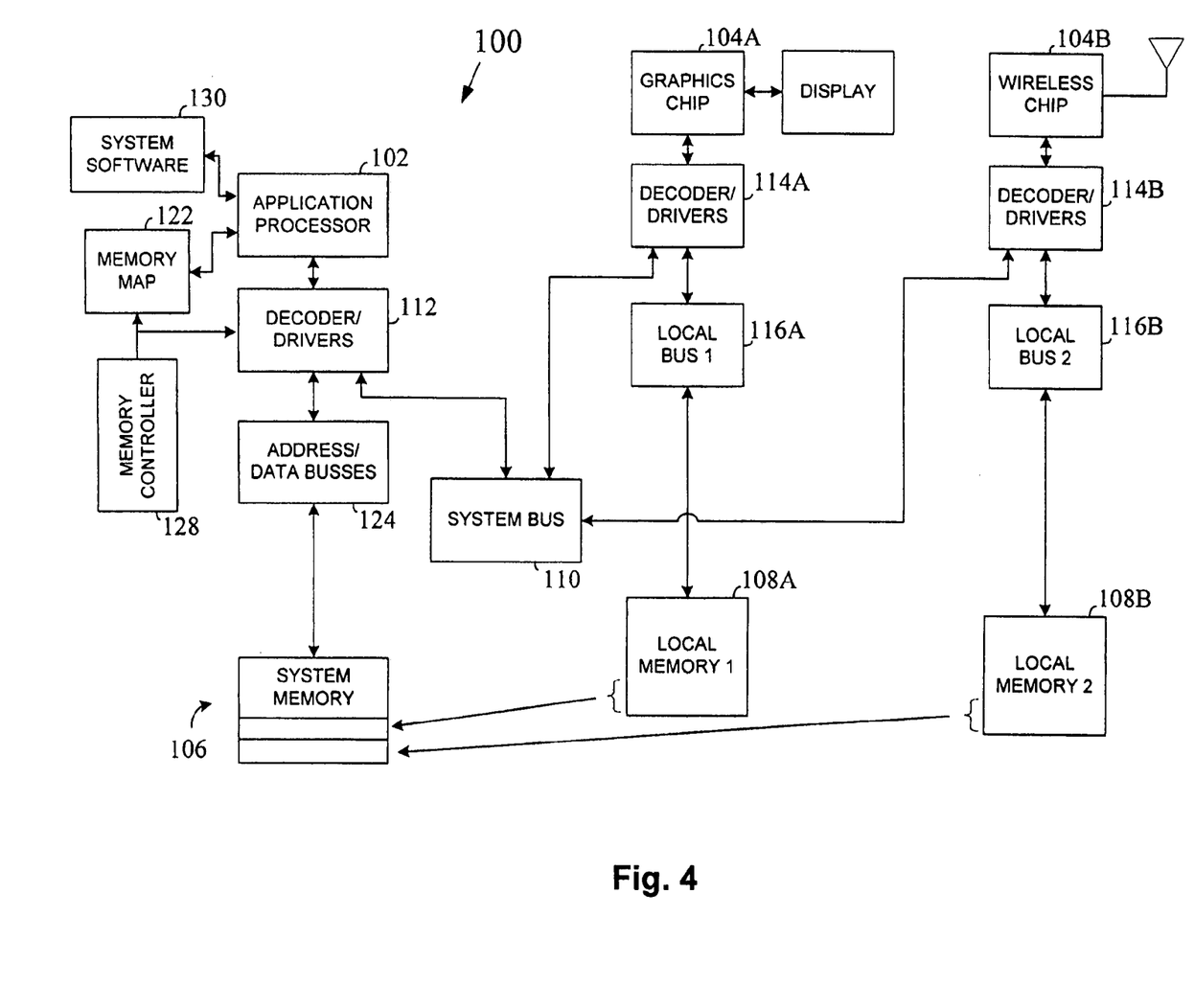
FIG. 4 is a block diagram of an example system with a local unified memory architecture in accordance with embodiments of the present invention.

In an embodiment in which system 100 is part of a wireless communication device, as illustrated in FIG. 4, the wireless communication device may include a graphics chip 104A, as one of companion devices 104, and a wireless chip 104B as another of the companion devices. The graphics chip 104A and the wireless chip 104B may each have an associated local memory 108A, 108B. In this embodiment, the application processor may identify available portions of the associated local memory, and map the available portions to system memory 106 for use by application processor 102. The mapped portions of the local memories may be accessed by the application processor using system bus cycles addressing the particular companion chip as described above. In this embodiment, data for transmission over a wireless link may be sent to the wireless chip 104B over system bus 110 by addressing the wireless chip. Data received over a wireless link may be similarly sent from the wireless chip 104B to the applications processor 102. Furthermore, data for display by the graphics chip 104A may be sent to the graphics chip 104A over system bus 110 by addressing the graphics chip.

Figure 2:
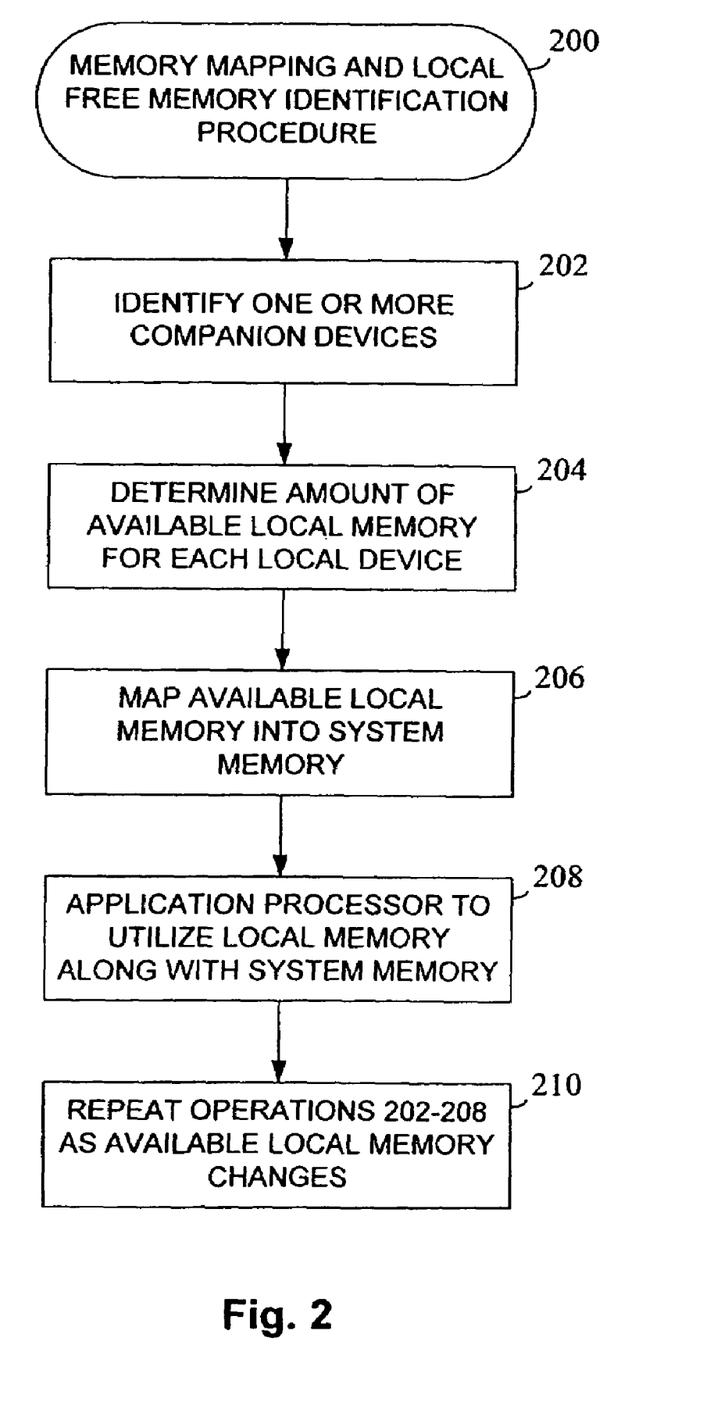
FIG. 2 is a flow chart of an example memory mapping and local free memory identification procedure in accordance with an embodiment of the present invention.

FIG. 2 is a flow chart of an example memory mapping and local free memory identification procedure in accordance with an embodiment of the present invention. Procedure 200 may be performed by a system with a local unified memory architecture (LUMA), such as system 100 (FIG. 1) although other systems may also be suitable for performing procedure 200.

In operation 202 an application processor may identify the companion devices that are operating as part of the system. The identification may take place at system turn on, system initiation, or in some cases, when a companion device is coupled to the system. System software 130 (FIG. 1) may identify one or more companion devices during system initiation.

In operation 204, an amount of available local memory is determined for the companion devices identified in operation 202. In some embodiments, the companion device may use a predetermined amount of local memory, while in other embodiments, the companion device may use a varying amount of local memory depending on the tasks and operations being performed by the companion device. In some cases, most or all of the available local memory (e.g., local memory portion 109 (FIG. 1)) may be available for use by the application processor.

In operation 206, the available portion of local memory is mapped into system memory. For example, memory portion 109 (FIG. 1) may be mapped into memory location 120 of system memory 106. The mapping may occur with system software 130 (FIG. 1) during system initiation resulting in partition in the memory map between low latency memory of memory elements 118 and higher latency of memory of portion 109. The mapping information may be stored in a system memory map, such as memory may 122 (FIG. 1).

In operation 208, the available memory mapped into memory location 120 is available to the application processor for use by application, allowing the application processor to utilize the mapped memory portion as it would any portion of the system memory. System driver calls to memory location 120 may be passed to the companion device over a system bus, and the companion device may perform read/write operations on behalf of the system memory. The system device drivers may accommodate any difference in latency.

In some embodiments, dynamic memory mapping may be performed. In these embodiments, operation 210 may repeat operations 202 through 208 to map additional local memory as it may become available, for example, when a new companion device is added or discovered, or the memory requirements of the companion device are reduced. In additional embodiments, operations 202 may repeat operations 202 through 208 to de-map any portion of local memory if it is needed by the companion device, for example, when the memory requirements of the companion device increase.

Although the individual operations of procedure 200 are illustrated and described as separate operations, one or more of the individual operations may be performed concurrently and nothing requires that the operations be performed in the order illustrated.

Figure 3:
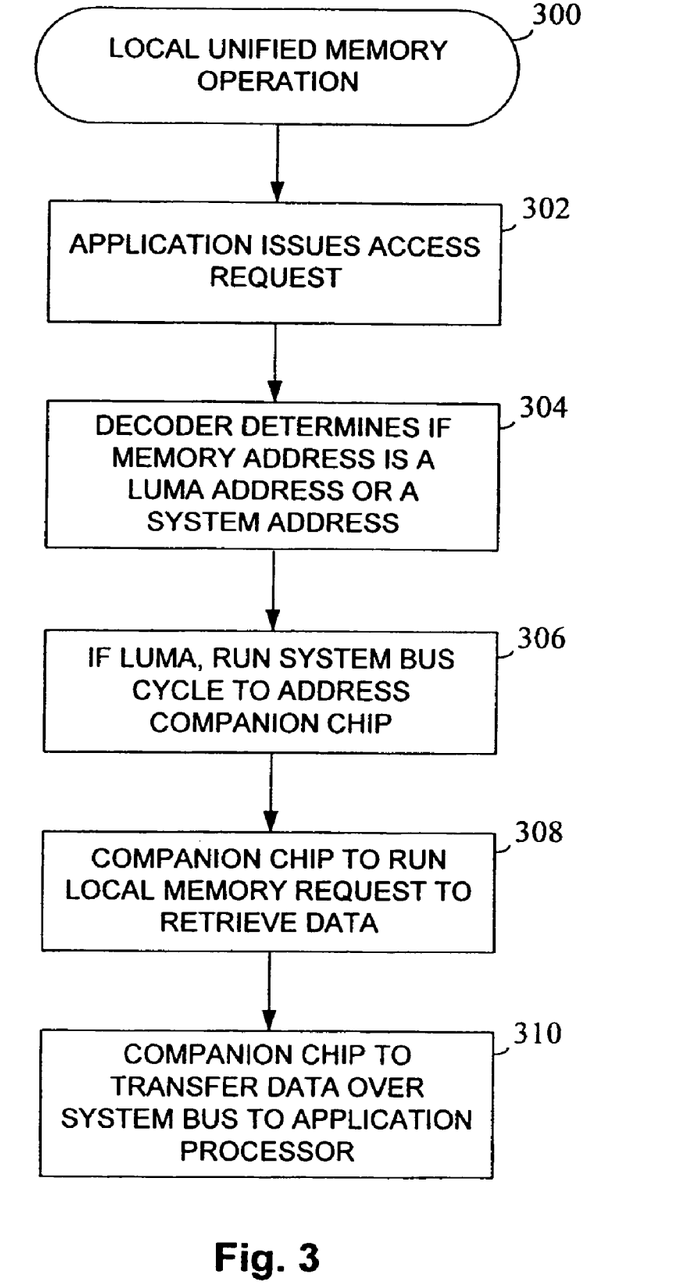
FIG. 3 is a flow chart of an example local unified memory operation procedure in accordance with an embodiment of the present invention.

FIG. 3 is a flow chart of an example local unified memory operation procedure in accordance with an embodiment of the present invention. Procedure 300 may be performed by a system with a local unified memory architecture (LUMA), such as system 100 (FIG. 1) although other systems may also be suitable for performing procedure 300. In operation 302, an application issues an memory access request. The access request may be a request to read or write data. The application may be running on an application processor, such as application processor 102 (FIG. 1) and the access request may address a particular memory location of system memory 106 (FIG. 1) including possibly mapped location 120. The application may be unaware that mapped location 120 is a mapped memory location mapped from available local memory 108 (FIG. 1), and may view location 120 as it does any system memory location of system memory 106.

In operation 304 a decoder may use a memory map to determine whether the memory location requested is a memory location mapped from local memory 108 (FIG. 1) (e.g., a local unified memory architecture (LUMA) address) or a memory location of the system memory. In operation 306, when operation 304 determines that the memory location is a LUMA address, a bus cycle may be run addressing the particular companion chip to read/write to the particular location of local memory 108. In some embodiments, this may be viewed as a call to the companion device. When operation 304 determines that the requested memory location is one of memory locations 118, the application processor may run a read or write cycle using system and address busses 124 to access system memory 106.

In operation 308, when the companion device is addressed in operation 306, the companion chip may run a local memory cycle to read data from local memory 108 (FIG. 1) or write data to local memory 108 (FIG. 1). In operation 310, in the case of a read request, the companion device may send requested data retrieved from its local memory to the application processor over the system bus as part of a system bus cycle. Operations 308 and 310 may also be performed to write data received over the system bus from the application processor to a local memory location allowing mapped portion 109 (FIG. 1) to function as would any element of system memory 106.

Although the individual operations of procedure 300 are illustrated and described as separate operations, one or more of the individual operations may be performed concurrently and nothing requires that the operations be performed in the order illustrated.

Thus, a system and method have been described in which distributed local memory is mapped into a system memory map. The system and method may reduce physical memory requirements of systems while providing additional memory resources. Examples of such as systems include systems with an embedded computer architecture as well as others. Furthermore, the system and method of embodiments of the present invention may reduce component count of systems reducing cost and increasing reliability.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A system comprising:
an application processor to execute one or more software applications;
a companion device, in communication with the application processor, to perform one or more companion functions;
a first memory in communication with said application processor;
a second memory in communication with said companion device; and
a memory mapper to map at least a portion of said first memory and at least a portion of said second memory into a system memory space for use by the application processor as memory that is not dedicated to a function associated with said companion device;
wherein said application processor is to issue an instruction to said companion device requesting access to a local bus associated with said companion device when an application running on said application processor identifies a system memory location that is mapped from the second memory, said instruction to act as an interrupt within said companion device;
wherein said application processor is to run a memory cycle using address and data busses to access the system memory when an application running on said application processor identifies a system memory location that is mapped from said first memory; and
wherein said memory mapper is programmed to identify an available portion of said second memory to be mapped into said system memory space, said available portion being a portion of said second memory that is not being used by said companion device to perform said one or more companion functions, wherein said available portion of said second memory varies based on current local memory demands of said companion device.

2. The system of claim 1, wherein:
said memory mapper is part of said application processor.

3. The system of claim 1, wherein:
said memory mapper is separate from said application processor.

4. The system of claim 1, wherein:
said application processor accesses said first memory through address and data busses.

5. The system of claim 4, wherein:
said companion device accesses said second memory through a local bus, wherein said local bus is different from said address and data busses used by said application processor to access said first memory.

6. The system of claim 1, wherein:
said second memory comprises an on-chip portion and an off-chip portion, said on-chip portion being located on-chip with said companion device and said off-chip portion being on a chip separate from said companion device.

7. A system comprising:
an application processor to execute one or more software applications;
a companion device, in communication with the application processor, to perform one or more companion functions;
a first memory in communication with said application processor;
a second memory in communication with said companion device; and
a memory mapper to map at least a portion of said first memory and at least a portion of said second memory into a system memory space for use by the application processor as memory that is not dedicated to a function associated with said companion device;
wherein said companion device includes a graphics chip coupled with a graphics display, said graphics chip utilizing a predetermined amount of said second memory to perform graphics functions, wherein a remaining amount of said second memory is available for mapping into said system memory space for use by said application processor, wherein said application processor sends data to said graphics chip for display by said graphics display by addressing said graphics chip over a system interconnect.

8. The system of claim 7, wherein:
said application processor accesses said first memory through address and data busses.

9. The system of claim 8, wherein:
said companion device accesses said second memory through a local bus, wherein said local bus is different from said address and data busses used by said application processor to access said first memory.

10. The system of claim 9, wherein:
said companion device is adapted to access said second memory through said local bus in response to a request from said application processor.

11. A system comprising:
an application processor to execute one or more software applications;
a companion device, in communication with the application processor, to perform one or more companion functions;
a first memory in communication with said application processor;
a second memory in communication with said companion device; and
a memory mapper to map at least a portion of said first memory and at least a portion of said second memory into a system memory space for use by the application processor as memory that is not dedicated to a function associated with said companion device;
wherein said companion device includes a wireless chip coupled to an antenna, said wireless chip including transceiver elements for receiving and transmitting data through said antenna, said wireless chip utilizing a predetermined amount of said second memory, wherein a remaining amount of said second memory is available for mapping into said system memory space for use by said application processor, and wherein said application processor sends data to said wireless chip for transmission by said antenna by addressing said wireless chip over a system interconnect.

12. The system of claim 11, wherein:
said application processor accesses said first memory through address and data busses.

13. The system of claim 12, wherein:
said companion device accesses said second memory through a local bus, wherein said local bus is different from said address and data busses used by said application processor to access said first memory.

14. The system of claim 13, wherein:
said companion device is adapted to access said second memory through said local bus in response to a request from said application processor.

15. A method comprising:
identifying an available portion of local memory of a companion device;
mapping the available portion into system memory for use by an application processor as memory that is not dedicated to a function associated with said companion device; and
running a system bus cycle to address the companion device to access the available portion for the application processor over a system bus, wherein running a system bus cycle includes delivering an interrupt to said companion device to interrupt the operation thereof to allow the available portion to be accessed for the application processor; and
running, by the application processor, a memory cycle using address and data busses to access the system memory when an application running on the application processor identifies a system memory location in the system memory that is not mapped from the local memory;
wherein the available portion of local memory varies depending on the operations being performed by said companion device, and wherein said method further comprises:
identifying the available portion when the available portion changes;
mapping additional portions of the local memory to the system memory when the available portion increases; and
removing portions of the local memory that were mapped into the system memory when the available portion decreases.

16. The method of claim 15 further comprising:
running, by the companion device, a local memory cycle to access data in the local memory in response to an access request received over the system bus as part of the system bus cycle; and
transferring the data over the system bus to the application processor as a result of the access request.

17. The method of claim 16 further comprising prior to running the system bus cycle, converting a memory location to a local memory location when an application running on an application processor identifies a system memory location mapped to the local memory.

18. The method of claim 15 wherein the companion device is a graphics chip coupled with a graphics display, the method further comprising
utilizing a portion of the local memory by the graphics chip;
mapping a remaining portion of the local memory into the system memory for use by an application processor; and sending data, by the application processor, to the graphics chip for display by the graphics display, the application processor addressing the graphics chip over the system bus.

19. The method of claim 15 wherein the companion device is a wireless chip coupled to an antenna, the wireless chip including transceiver elements for receiving and transmitting data through the antenna, the method further comprising:

utilizing, by the wireless chip, a portion of the local memory;

mapping a remaining portion of the local memory into the system memory for use by an application processor;

sending data from the application processor to the wireless chip for transmission by the antenna by addressing the wireless chip over the system bus utilizing a system bus cycle; and receiving data through the antenna at the wireless chip, the wireless chip sending the received data to the application processor over the system bus utilizing a system bus cycle.

20. A wireless communication device comprising:

a graphics chip having an associated local memory and coupled with a display;

a wireless chip having an associated local memory and coupled with a dipole antenna; and an application processor to communicate with the graphics chip and wireless chip over a system bus, the application processor to identify available portions of the associated local memories and map the available portions into a system memory for use by the application processor in running a system application.

21. The device of claim 20 wherein the system application issues a read request to read data from a memory location, the system further comprising:

a decoder to determine whether a memory location requested by the system application is within the system memory or within one of the associated local memories and mapped to the system memory.

22. The device of claim 21 wherein when the memory location is mapped from one of the associated local memories, the application processor initiates a system bus cycle to address either the graphics or wireless chip to read the data from the associated local memory through either the graphics or wireless chip.

23. The device of claim 20 wherein the application processor runs a memory cycle using system address and data busses to read from the system memory when the application running on the application processor identifies a system memory location in the system memory that is not mapped to one of the local memories.

24. An article comprising a storage medium having stored thereon instructions that, when executed by a computing platform, result in:

identifying an available portion of local memory of a companion device;

mapping the available portion into system memory for use by an application processor as memory that is not dedicated to a function associated with said companion device;

running a system bus cycle to address the companion device to access the available portion for the application processor over a system bus, wherein running a system bus cycle includes delivering an interrupt to said companion device to interrupt the operation thereof to allow the available portion to be accessed for the application processor;

running, by the application processor, a memory cycle using address and data busses to access the system memory when an application identifies a system memory location in the system memory that is not mapped from the local memory; and prior to running the system bus cycle, converting a memory location to a local memory location when an application running on an application processor identifies a system memory location mapped from the local memory.

25. The article of claim 24 wherein the instructions, when executed by the computing platform, further result in:

running, by the companion device, a local memory cycle to access data in the local memory in response to an access request received over the system bus as part of the system bus cycle; and transferring the data over the system bus as a result of the access request.

* * * * *